(12) United States Patent
Shin et al.

(10) Patent No.: US 12,487,721 B2
(45) Date of Patent: Dec. 2, 2025

(54) METHOD AND SYSTEM FOR EXPOSING ONLINE CONTENT

(71) Applicant: NAVER CORPORATION, Seongnam-si (KR)

(72) Inventors: Hyun Chul Shin, Seongnam-si (KR); Moo Young Youn, Seongnam-si (KR); Cheoloh Park, Seongnam-si (KR); SiMyoung Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 88 days.

(21) Appl. No.: 17/663,699

(22) Filed: May 17, 2022

(65) Prior Publication Data

US 2022/0391046 A1 Dec. 8, 2022

(30) Foreign Application Priority Data

Jun. 3, 2021 (KR) .................. 10-2021-0072393
Sep. 14, 2021 (KR) .................. 10-2021-0122428

(51) Int. Cl.
| | | |
|---|---|---|
| *G06F 3/048* | (2013.01) | |
| *G06F 3/0481* | (2022.01) | |
| *G06F 3/0488* | (2022.01) | |
| *G06F 9/451* | (2018.01) | |
| *G06Q 30/0241* | (2023.01) | |
| *G06Q 30/0272* | (2023.01) | |

(52) U.S. Cl.
CPC .......... *G06F 3/0481* (2013.01); *G06F 3/0488* (2013.01); *G06F 9/451* (2018.02); *G06Q 30/0272* (2013.01); *G06Q 30/0276* (2013.01)

(58) Field of Classification Search
CPC ..... G06F 3/048; G06F 9/451; G06Q 30/0272; G06Q 30/0276; G06Q 30/0241; G06Q 30/0251; G06Q 30/0277
See application file for complete search history.

(56) References Cited

U.S. PATENT DOCUMENTS

| | | | | |
|---|---|---|---|---|
| 9,479,615 | B1* | 10/2016 | Kleber | ............... H04L 67/01 |
| 9,552,440 | B1* | 1/2017 | Krecichwost | ....... G06F 16/9577 |
| 9,715,901 | B1* | 7/2017 | Singh | .................. H04N 21/8547 |
| 9,990,650 | B1* | 6/2018 | Kakani | ............... G06Q 30/0277 |
| 10,600,071 | B2* | 3/2020 | Wigder | .............. G06Q 30/0255 |
| 2001/0007980 | A1 | 7/2001 | Ishibashi et al. | |
| 2008/0220747 | A1* | 9/2008 | Ashkenazi | ............. G06Q 30/02 |
| | | | | 455/414.1 |
| 2008/0288983 | A1* | 11/2008 | Johnson | ............... H04N 21/812 |
| | | | | 725/46 |

(Continued)

FOREIGN PATENT DOCUMENTS

| | | |
|---|---|---|
| JP | 2001195412 A | 7/2001 |
| KR | 101428641 B1 | 8/2014 |
| KR | 101699909 B1 | 1/2017 |

*Primary Examiner* — Patrick F Riegler
(74) *Attorney, Agent, or Firm* — Greer Burns & Crain Ltd.

(57) ABSTRACT

A method for exposing online content is provided, including outputting a first interstitial user interface, outputting an interstitial content in a process of transition from the first interstitial user interface to a second interstitial user interface, and outputting a portion of the second interstitial user interface on a portion of the interstitial content to allow a user to recognize the second interstitial user interface.

17 Claims, 9 Drawing Sheets

(56) References Cited

U.S. PATENT DOCUMENTS

| | | | |
|---|---|---|---|
| 2009/0287567 A1* | 11/2009 | Penberthy | G06F 16/00 705/14.54 |
| 2009/0300490 A1* | 12/2009 | Lejano | G06F 40/106 715/277 |
| 2011/0010367 A1* | 1/2011 | Jockish | G06Q 10/10 715/764 |
| 2011/0169764 A1* | 7/2011 | Miyoshi | G06F 3/04883 345/173 |
| 2011/0231265 A1* | 9/2011 | Brown | G06Q 30/0277 705/14.73 |
| 2012/0030013 A1* | 2/2012 | Tsay | G06Q 30/0251 715/730 |
| 2013/0085849 A1* | 4/2013 | Dyor | G06Q 30/0255 705/14.49 |
| 2013/0117105 A1* | 5/2013 | Dyor | G06F 16/954 705/14.52 |
| 2013/0117111 A1* | 5/2013 | Dyor | G06F 3/0481 705/26.1 |
| 2013/0117130 A1* | 5/2013 | Dyor | G06Q 30/06 705/14.69 |
| 2013/0254689 A1* | 9/2013 | Clift | G06F 3/0481 715/765 |
| 2013/0311300 A1* | 11/2013 | Scarborough | G06Q 30/02 705/14.69 |
| 2013/0325617 A1* | 12/2013 | Delug | H04L 67/565 705/14.64 |
| 2014/0074588 A1* | 3/2014 | Bertsch | G06Q 30/02 705/14.42 |
| 2014/0095315 A1* | 4/2014 | Narendra | G06F 3/0488 705/14.64 |
| 2014/0258405 A1* | 9/2014 | Perkin | H04W 4/21 709/204 |
| 2014/0270704 A1* | 9/2014 | Zaveri | H04N 21/4882 386/248 |
| 2014/0366117 A1* | 12/2014 | Kumar | H04L 63/10 726/11 |
| 2015/0046235 A1* | 2/2015 | O'Connor | G06Q 30/0274 705/14.7 |
| 2015/0081448 A1* | 3/2015 | Osotio | G06Q 30/0269 705/14.66 |
| 2015/0242875 A1* | 8/2015 | Stachowski | G06Q 30/0214 715/201 |
| 2015/0242907 A1* | 8/2015 | Wray | G06Q 30/0275 705/14.71 |
| 2015/0379160 A1* | 12/2015 | Avraham | G06F 3/0484 715/767 |
| 2016/0104201 A1* | 4/2016 | Greenberg | G06F 3/0484 705/14.64 |
| 2016/0117716 A1* | 4/2016 | Lin | H04L 65/60 705/14.4 |
| 2016/0127442 A1* | 5/2016 | Long | H04L 67/53 709/217 |
| 2016/0202861 A1* | 7/2016 | Weskamp | G06Q 30/0277 715/719 |
| 2016/0283978 A1* | 9/2016 | Rabbat | G06F 3/04842 |
| 2016/0299654 A1* | 10/2016 | Mai | G06Q 30/0246 |
| 2017/0161782 A1* | 6/2017 | Wigder | G06Q 30/0272 |
| 2017/0193566 A1* | 7/2017 | Lucash | G06Q 30/0277 |
| 2017/0300457 A1* | 10/2017 | Wigder | G06Q 30/0241 |
| 2018/0197575 A1* | 7/2018 | Doherty | G06Q 30/0276 |
| 2018/0225024 A1* | 8/2018 | Tsai | G06F 3/04817 |
| 2019/0073106 A1* | 3/2019 | Zhou | G06F 3/04883 |
| 2019/0082221 A1* | 3/2019 | Jain | H04N 21/454 |
| 2020/0137464 A1* | 4/2020 | Lewis | G06F 16/483 |
| 2021/0312118 A1* | 10/2021 | McClendon, Jr. | G06F 3/04812 |
| 2021/0326930 A1* | 10/2021 | Tran | G06F 3/0488 |
| 2022/0046302 A1* | 2/2022 | Shanson | H04N 21/8456 |
| 2022/0207563 A1* | 6/2022 | Kimura | G06Q 30/0277 |

* cited by examiner

METHOD AND SYSTEM FOR EXPOSING ONLINE CONTENT

CROSS-REFERENCE TO RELATED APPLICATIONS

This application claims priority to Korean Patent Application No. 10-2021-0072393 and No. 10-2021-0122428, filed in the Korean Intellectual Property Office on Jun. 3, 2021, and Sep. 14, 2021, respectively, the entire contents of which are hereby incorporated by reference.

BACKGROUND OF THE INVENTION

Field of Invention

The present disclosure relates to a method and system for exposing online content, and more specifically, to a method and system for exposing online content, which output an interstitial advertisement during a transition from one interstitial user interface covering the entire display of a user terminal to another interstitial user interface, while outputting a portion of the interstitial user interface on a portion of the interstitial advertisement to enable the user to recognize the interstitial user interface.

Description of Related Art

Recently, as the use of traditional media such as TVs is decreased and the use of internet-based online media such as computers and smart phones is increased, the preference of advertisers for online advertisement is increased. For example, providers of online media may sell advertisers the advertisement products that can display online advertisements in a specific position or area on a display of a user terminal of the corresponding media. In particular, the "interstitial advertisement" output on the entire area of the display of the user terminal or the web page or application displayed on the display provides excellent advertising effect in that it can ensure that the user recognizes the advertisement content or related product information.

In general, interstitial advertisements are exposed when the user enters a new user interface or page by selecting a specific service or function. Accordingly, when the interstitial advertisement is output instead of the page the user intends to enter, the user may be confused as to whether he or she is at the correct intended page, rather than viewing the corresponding advertisement. In addition, once the interstitial advertisement is output, additional inputs are usually required in order for the user to exit the corresponding advertisement. For example, the user may press a close button displayed above the advertisement page or swipe the page away from the touch screen to exit the interstitial advertisement. However, the method for exiting the interstitial advertisement is not displayed or displayed in a difficult to understand manner in many cases, causing inconvenience to users.

BRIEF SUMMARY OF THE INVENTION

In order to solve the problems described above, the present disclosure provides a method for, a non-transitory computer-readable recording medium storing instructions for, and an apparatus (system) for exposing online advertisements.

The present disclosure may be implemented in a variety of ways, including a method, an apparatus (system), or a non-transitory computer-readable storage medium storing instructions.

According to an embodiment, a method for exposing online advertisements is provided, which may be executed by one or more processors and include outputting a first interstitial user interface, outputting an interstitial advertisement in a process of transition from the first interstitial user interface to a second interstitial user interface, and outputting a portion of the second interstitial user interface on a portion of the interstitial advertisement to allow a user to recognize the second interstitial user interface.

According to another embodiment, a method for exposing online advertisements is provided, which may be executed by one or more processors and include in response to a user input requesting access to a first interstitial user interface, determining whether or not to output an interstitial advertisement, outputting a first interstitial user interface, in response to a user input requesting to transition from the first interstitial user interface to a second interstitial user interface, selectively outputting the interstitial advertisement according to the determination of whether or not to output the interstitial advertisement, and when the interstitial advertisement is output, outputting a portion of the second interstitial user interface on a portion of the interstitial advertisement to allow a user to recognize the second interstitial user interface.

According to still another embodiment, a method for exposing online advertisements in an application including a plurality of interstitial user interfaces that can be transitioned to each other according to a user input of swiping a display is provided, in which the method may be executed by one or more processors and include receiving a user input for setting an interstitial advertisement to be placed between a first interstitial user interface and a second interstitial user interface of the plurality of interstitial user interfaces, outputting the first interstitial user interface on the display, determining whether the interstitial advertisement is set to be placed between the first interstitial user interface and the second interstitial user interface based on the user input, when the interstitial advertisement is set to be placed, according to a user input of swiping the display, outputting the interstitial advertisement on the display in a process of transition from the first interstitial user interface to the second interstitial user interface, and in response to a user input of swiping the display on which the interstitial advertisement is output, outputting the second interstitial user interface on the display.

There is provided a non-transitory computer-readable recording medium storing instructions for executing, on a computer, the method for exposing online advertisements according to an embodiment.

According to an embodiment, a system for exposing online advertisements is provided, which may include a memory; and one or more processors connected to the memory and configured to execute one or more computer-readable programs included in the memory, in which the one or more programs may include instructions for outputting a first interstitial user interface, outputting an interstitial advertisement in a process of transition from the first interstitial user interface to a second interstitial user interface, and outputting a portion of the second interstitial user interface on a portion of the interstitial advertisement to allow a user to recognize the second interstitial user interface.

According to another embodiment, a system for exposing online advertisements may include a memory, and one or more processors connected to the memory and configured to execute one or more computer-readable programs included in the memory, in which the one or more programs may include instructions for, in response to a user input requesting access to a first interstitial user interface, determining whether or not to output an interstitial advertisement, outputting a first interstitial user interface, in response to a user input requesting to transition from the first interstitial user interface to a second interstitial user interface, selectively outputting the interstitial advertisement according to the determination of whether or not to output the interstitial advertisement, and when the interstitial advertisement is output, outputting a portion of the second interstitial user interface on a portion of the interstitial advertisement to allow a user to recognize the second interstitial user interface.

According to still another embodiment, a system for exposing online advertisements is provided, which may include a memory, a display, and one or more processors connected to the memory and configured to execute one or more computer-readable programs included in the memory, in which the one or more computer-readable programs may include instructions for, according to a user input of swiping the display, receiving a user input for setting an interstitial advertisement to be placed between a first interstitial user interface and a second interstitial user interface of the plurality of interstitial user interfaces that can be transitioned to each other, outputting the first interstitial user interface on the display, determining whether the interstitial advertisement is set to be placed between the first interstitial user interface and the second interstitial user interface based on the user input, when the interstitial advertisement is set to be placed, according to a user input of swiping the display, outputting the interstitial advertisement on the display in a process of transition from the first interstitial user interface to the second interstitial user interface, and in response to a user input of swiping the display on which the interstitial advertisement is output, outputting the second interstitial user interface on the display.

According to some embodiments of the present disclosure, a portion of the second interstitial user interface is displayed on a portion of the interstitial advertisement so that the user is able to recognize that an interstitial advertisement is displayed in a process of transition from the first interstitial user interface to the second interstitial user interface, and that the user can transition to the second interstitial user interface with a user input, and accordingly, it is possible to promote user convenience while maintaining the high advertising effect of the interstitial advertisement.

According to some embodiments of the present disclosure, after time for the user to recognize the second interstitial user interface elapses, by decreasing the output area of the second interstitial user interface and increasing the output area of the advertisement, it is possible to efficiently expose advertisements while maintaining user convenience.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF THE INVENTION

Figure 1:
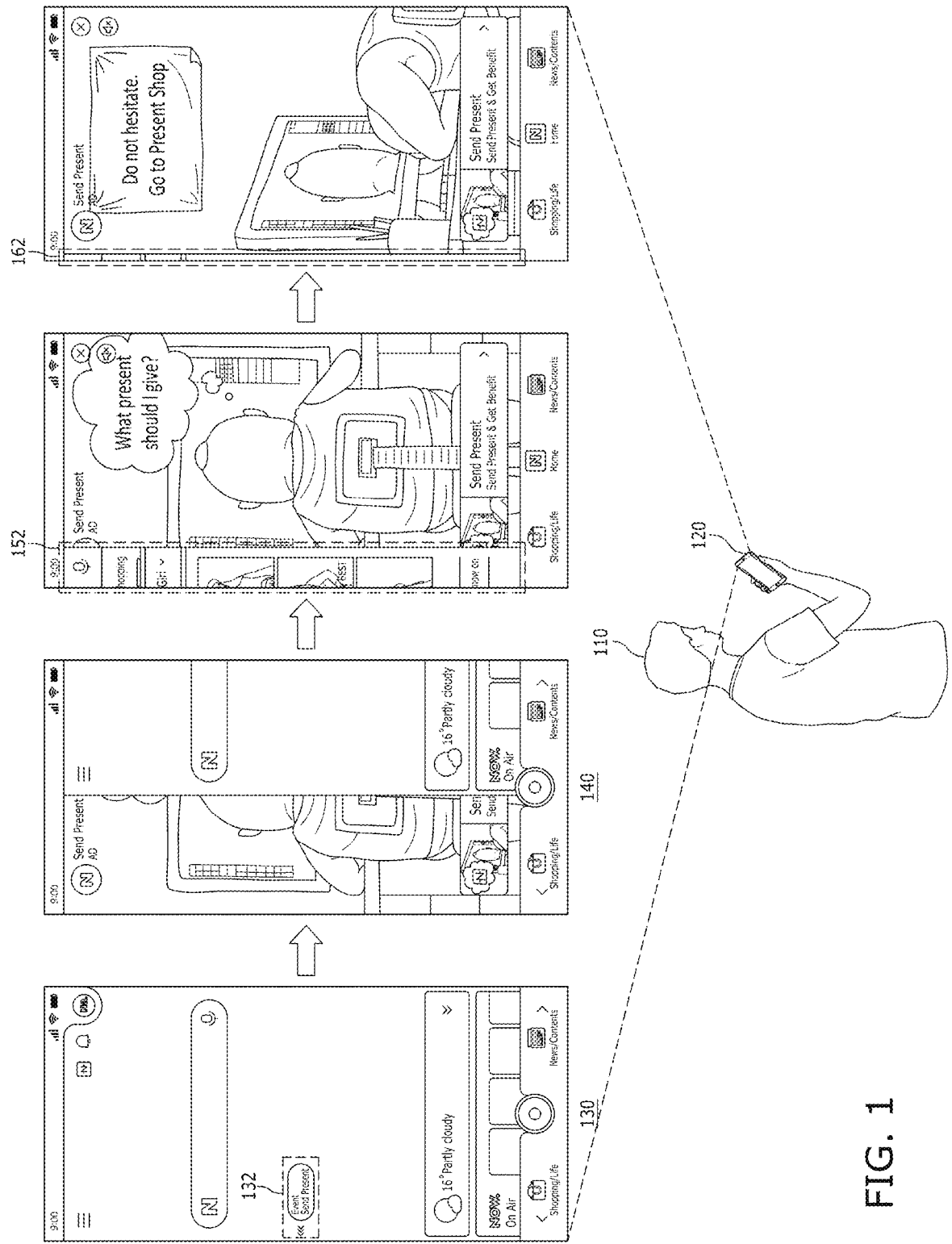
FIG. 1 is a diagram illustrating an example of a method for exposing online advertisements according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various forms different from each other, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary. In the present disclosure, "each of a plurality of A" may refer to each of all components included in the plurality of A, or may refer to each of some of the components included in a plurality of A.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, "display" may refer to any display device associated with a computing device, and for example, it may refer to any display device that is controlled by the computing device, or that can display any information/data provided from the computing device.

In the present disclosure, "interstitial content" may be online content output on the entire area of a page displayed on a display of the user terminal, and an "interstitial advertisement" is one form of online content and may refer to an advertisement output on the entire area of a page displayed on a display of the user terminal. In an example, the page may include a display area of the display of the user terminal, an execution area of a specific application, a specific user interface, and the like. In some embodiments, an interstitial advertisement may include an advertisement that is output on most of the area rather than the entire area of the page. For example, an interstitial advertisement may include an advertisement output on areas excluding an area such as a status display area, a menu area, and the like, that is always displayed on the display of the user terminal without being affected by the outputs, changes, or movements of the page.

An "affordance" as used herein may include a user interface that can induce a user to perform a certain action. For example, it may include a user interface formed of button, icon, link, image, text, image, and the like that induces an input of a user such as click, touch, or swipe to move to a specific page, but is not limited thereto.

FIG. 1 is a diagram illustrating an example of a method for exposing online content or advertisements according to an embodiment. As illustrated, an online advertisement may be exposed at a transition between the interstitial user interfaces displayed on the entire area on the display of a user terminal 120. According to an embodiment, in response to an input of a user 110 requesting access to a first interstitial user interface 130, the processor of the user terminal 120 may output the first interstitial user interface 130 on the display. In this case, the input of the user 110 requesting access to the first interstitial user interface 130 may include a touch or click input on an icon for executing an application, a touch or click, or drag input on an icon or button for transitioning from another page to the first interstitial user interface 130, and the like. For example, when the first interstitial user interface 130 is a home screen of an Internet search or portal service, the processor of the user terminal 120 may display the home screen on the display of the user terminal 120 in response to an input of the user 110 touching the icon of the corresponding service application to execute the application.

According to an embodiment, the first interstitial user interface 130 may include an affordance 132. The affordance 132 may include a user interface that can induce a user to perform a certain action. For example, as illustrated, the affordance 132 may be a user interface that induces a transition from the first interstitial user interface 130 to an interstitial advertisement.

Additionally, in response to a user input requesting access to the first interstitial user interface 130, the processor of the user terminal 120 may receive data associated with the interstitial advertisement. In this case, the processor of the user terminal 120 may receive the corresponding data from an external server (or information processing system) that stores and manages the data associated with the interstitial advertisement. For example, the data associated with the interstitial advertisement may include text, image, animation or video data for outputting the interstitial advertisement. In another example, the data associated with the interstitial advertisement may include data for determining whether or not to output the interstitial advertisement, such as whether the interstitial advertisement is allocated between the first interstitial user interface 130 and another interstitial user interface, whether there is an advertiser requested the interstitial advertisement, whether an exposure period of the interstitial advertisement starts or ends, and the like. Additionally, the processor may receive data associated with the affordance 132 along with the data associated with the interstitial advertisement.

Additionally or alternatively, the processor may determine whether or not to output the interstitial advertisement in response to a user input requesting access to the first interstitial user interface 130. For example, the processor may determine whether or not to output the interstitial advertisement according to whether the data associated with the interstitial advertisement is received, the number of times or time period of advertisement exposures, or the like. The determining of whether or not to output the interstitial advertisement may be performed by the processor of the user terminal 120 or the processor of the information processing system.

In an embodiment, the processor of the user terminal 120 may output an interstitial advertisement during a transition 140 from the first interstitial user interface 130 to the second interstitial user interface. The transition 140 from the first interstitial user interface 130 to the interstitial advertisement may be performed in response to an input of the user 110. For example, in response to an input of the user 110 (e.g., an operation, such as a swipe, of moving the user's hand from one side to the other side of the screen of the user terminal 120) requesting to transition from the first interstitial user interface 130 to the second interstitial user interface, the processor of the user terminal 120 may output an interstitial advertisement. As another example, the processor may output an interstitial advertisement in response to an input of the user 110 to the affordance 132 included in the first interstitial user interface 130.

Additionally or alternatively, the processor of the user terminal 120 may selectively output the interstitial advertisement according to the determination of whether or not to output the interstitial advertisement. In an embodiment, when it is determined not to output the interstitial advertisement, the processor of the user terminal 120 may not output the affordance 132 in the first interstitial user interface 130. In addition, in this case, the processor of the user terminal 120 may output the second interstitial user interface in response to the input of the user 110 requesting to transition from the first interstitial user interface 130 to the second interstitial user interface.

The processor of the user terminal 120 may output a portion of the second interstitial user interface on a portion of the interstitial advertisement to allow the user to recognize the second interstitial user interface. With such a configuration, the user is able to recognize that the interstitial advertisement is displayed in the process of transition from the first interstitial user interface to the second interstitial user interface, and that the user can transition to the second interstitial user interface when desired, and accordingly, user convenience can be promoted while the high advertisement effect of the interstitial advertisement is maintained.

The interstitial advertisement and a portion of the second interstitial user interface may be output by various operations. For example, in response to the user input requesting to transition from the first interstitial user interface to the second interstitial user interface, an interstitial advertisement may be output on the second interstitial user interface in an overlapping manner. As another example, the interstitial advertisement may be output to be exposed in the same direction as the direction in which the user swiped the display (e.g., from left to right), while a portion of the second interstitial user interface may be output so as to be exposed in the same direction as the interstitial advertisement, and disappear in a direction opposite to the direction it appeared.

In addition, the interstitial advertisement and a portion of the second interstitial user interface may be arranged in various ways and output. For example, as illustrated, a portion of the second interstitial user interface may be output in such a form that overlies the interstitial advertisement. As another example, the interstitial advertisement may be output on the remaining area on the display of the user terminal 120 where the portion of the second interstitial user interface is not output.

Additionally or alternatively, the output area of the portion of the second interstitial user interface may be changed. For example, the processor may output a portion of the second interstitial user interface to a first area 152 and after a predetermined time elapses, the processor may change the output area of the portion of the second interstitial user interface to a second area 162. In this case, the size of the second area may be smaller than that of the first area. According to an embodiment, the process of changing the output area may be implemented with an animation effect. The sizes of the areas 152 and 162 outputting the portion of the second interstitial user interface may be designated in various ways. For example, the sizes of the areas 152 and 162 may be designated according to various criteria, such as the number of pixels displayed on the display of the user terminal 120, a ratio of the display to the entire screen, and the like.

With such a configuration, after the interstitial advertisement and the portion of the second interstitial user interface are output on the display of the user terminal 120, and then after a time for the user to recognize the second interstitial user interface elapses, by decreasing the output area of the second interstitial user interface and increasing the output area of the advertisement, it is possible to efficiently expose advertisements while maintaining user convenience.

Figure 2:
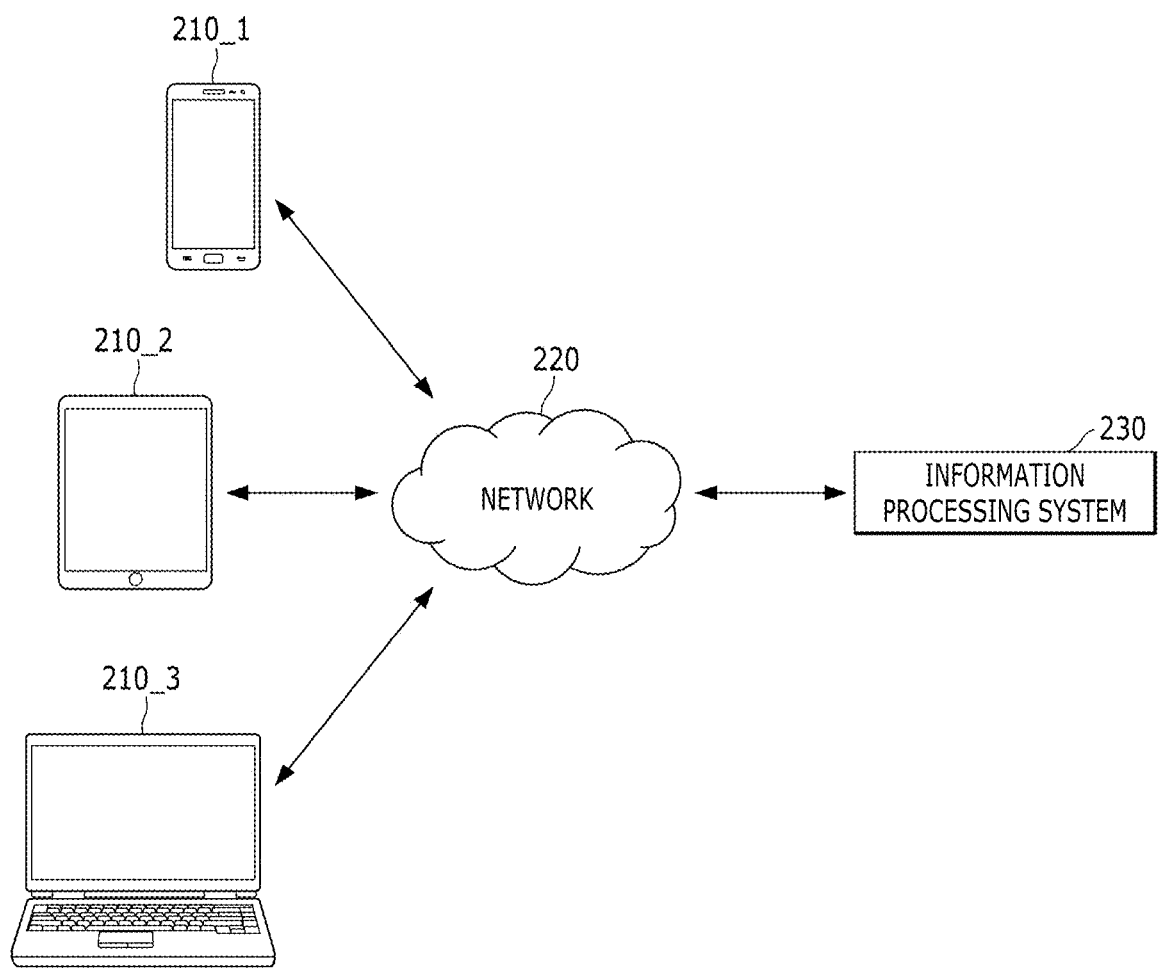
FIG. 2 is a schematic diagram illustrating a configuration in which an information processing system is communicatively connected to a plurality of user terminals to perform the method for exposing online advertisements according to an embodiment.

FIG. 2 is a schematic diagram illustrating a configuration in which an information processing system 230 is communicatively connected to a plurality of user terminals 210_1, 210_2, and 210_3 to perform a method for exposing online content or advertisements according to an embodiment. The information processing system 230 may include system(s) capable of exposing online advertisements. In an embodiment, the information processing system 230 may include one or more server devices and/or databases, or one or more distributed computing devices and/or distributed databases based on cloud computing services, which can store, provide and execute computer-executable programs (e.g., downloadable applications) and data associated with the online advertisement exposure. For example, the information processing system 230 may include separate systems (e.g., servers) for online advertisement exposure.

The online advertisement provided by the information processing system 230 may be provided to the user through the application or the like installed in each of the plurality of user terminals 210_1, 210_2, and 210_3. For example, the information processing system 230 may provide data related to the interstitial advertisement to the user terminals 210_1, 210_2, and 210_3 through the application and expose the interstitial advertisement.

The plurality of user terminals 210_1, 210_2, and 210_3 may communicate with the information processing system 230 through a network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and so on) that may be included in the network 220 as well as short-range wireless communication between the user terminals 210_1, 210_2, and 210_3.

In FIG. 2, a mobile phone terminal 210_1, a tablet terminal 210_2, and a PC terminal 210_3 are illustrated as the examples of the user terminal 120, but embodiments are not limited thereto, and the user terminals 210_1, 210_2, and 210_3 may be any computing device that is capable of wired and/or wireless communication and that can be installed with the media content providing application and the like and execute the same. For example, the user terminal may include a smartphone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 illustrates that three user terminals 210_1, 210_2, and 210_3 are in communication with the information processing system 230 through the network 220, but embodiments are not limited thereto, and a different number of user terminals may be configured to be in communication with the information processing system 230 through the network 220.

In an embodiment, the information processing system 230 may receive a request for access to the first interstitial user interface from the user terminals 210_1, 210_2, and 210_3. In response, the information processing system 230 may provide data associated with the interstitial advertisement to the user terminals 210_1, 210_2, and 210_3.

Figure 3:
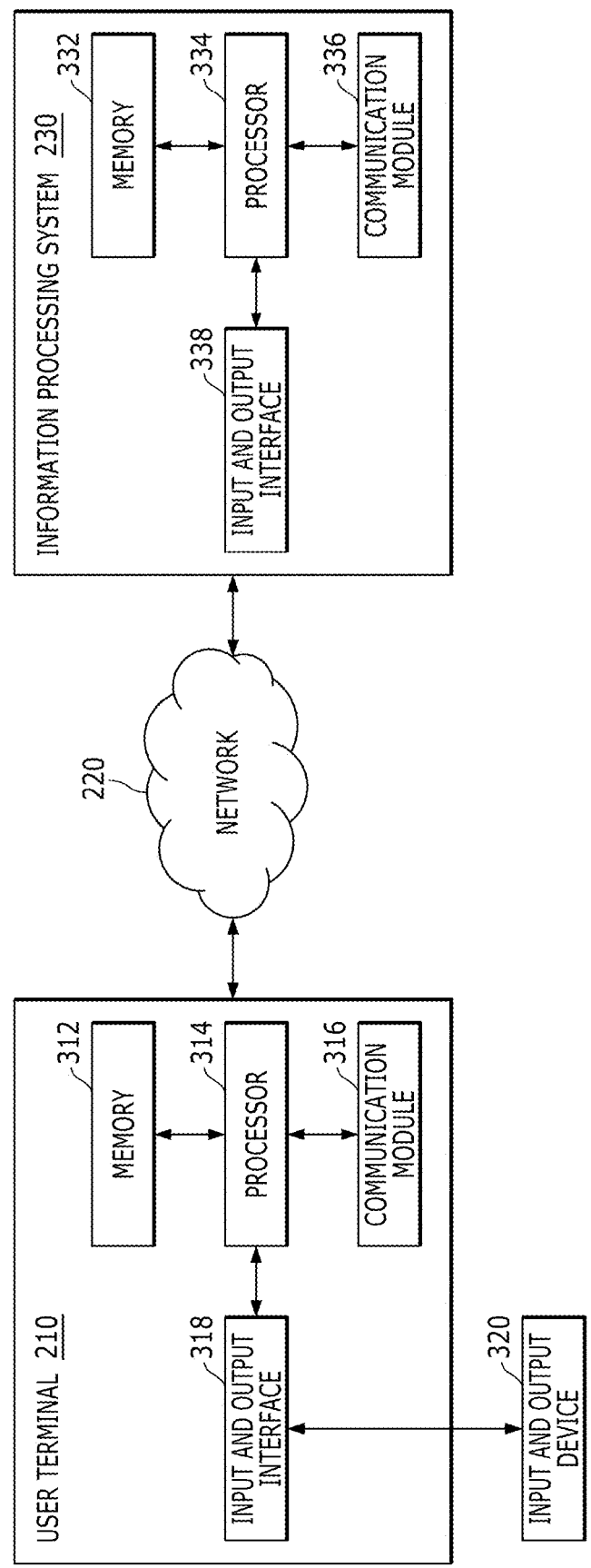
FIG. 3 is a block diagram of an internal configuration of a user terminal and the information processing system according to an embodiment.

FIG. 3 is a block diagram of an internal configuration of the user terminal 210 and the information processing system 230 according to an embodiment. The user terminal 210 may refer to any computing device that is capable of executing the application and so on and also capable of wired/wireless communication, and may include the mobile phone terminal 210_1, the tablet terminal 210_2, or the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 110 or to output information and/or data generated from the user terminal 110 through the input and output interface 318.

The memories 312 and 332 may include any non-transitory computer-readable recording medium. According to an embodiment, the memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is separate from the memory. In addition, an operating system and at least one program code (e.g., a code for an application, and the like for the online advertisement exposure) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules 316 and 336 rather than the computer-readable recording medium. For example, at least one program may be loaded into the memories 312 and 332 based on a computer program (e.g., applications for online advertisement exposure, and the like) installed by files provided by developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., the request for access to the first interstitial user interface, and so on) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 via the communication module 336 and the network 220. For example, the user terminal 210 may receive data and the like associated with the interstitial advertisement from the information processing system 230 through the communication module 316.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. While FIG. 3 illustrates that the input and output device 320 is not included in the user terminal 210, embodiments are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. In FIG. 3, while the input and output interfaces 318 and 338 are illustrated as the components configured separately from the processors 314 and 334, embodiments are not limited thereto, and the input and output interfaces 318 and 338 may be configured to be included in the processors 314 and 334.

The user terminal 210 and the information processing system 230 may include more than those components illustrated in FIG. 3. However, most of the related components may not necessarily require exact illustration. According to an embodiment, the user terminal 210 may be implemented to include at least a part of the input and output device 320 described above. In addition, the user terminal 210 may further include another component such as a transceiver, a global positioning system (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, and so on are further included in the user terminal 210.

According to an embodiment, the processor 314 of the user terminal 210 may be configured to operate an application for online advertisement exposure, or the like. In this case, a program code associated with the application may be loaded into the memory 312 of the user terminal 210. While the application is running, the processor 314 of the user terminal 210 may receive information and/or data provided from the input and output device 320 through the input and output interface 318 or receive information and/or data from the information processing system 230 through the communication module 316, and process the received information and/or data and store it in the memory 312. In addition, such information and/or data may be provided to the information processing system 230 through the communication module 316.

While the application or the like is running, the processor 314 may receive voice data, text, image, video, and the like input or selected through the input device such as a camera, a microphone, and the like that includes a touch screen, a keyboard, an audio sensor and/or an image sensor connected to the input and output interface 318, and store the received voice data, text, image, and/or video or the like in the memory 312, or provide it to the information processing system 230 through the communication module 316 and the network 220. In an embodiment, the processor 314 may receive a request or the like for access to the first interstitial user interface through the input device 320, such as a touch screen, a mouse, and the like, and data and the like associated with the interstitial advertisement may be provided to the information processing system 230 through the communication module 316 and the network 220.

The processor 314 of the user terminal 210 may transmit and output the information and/or data to the input/output device 320 through the input and output interface 318. For example, the processor 314 of the user terminal 210 may output the processed information and/or data through the output device 320 such as a device capable of outputting a display (e.g., a touch screen, a display, and the like), a device capable of outputting a voice (e.g., speaker), and the like. In an embodiment, the processor 314 may display the first interstitial user interface, an interstitial advertisement, a portion of the second interstitial user interface, and the like on the display of the user terminal 210.

The processor 334 of the information processing system 230 may be configured to manage, process, and/or store information and/or data received from a plurality of user terminals 210 and/or a plurality of external systems. The information and/or data processed by the processor 334 may be provided to the user terminals 210 through the communication module 336 and the network 220. In an embodiment, the processor 334 of the information processing system 230 may receive the request for access to the first interstitial user interface, and in response, provide the data associated with the interstitial advertisement to the user terminal 210 through the communication module 336 and the network 220.

Figure 4:
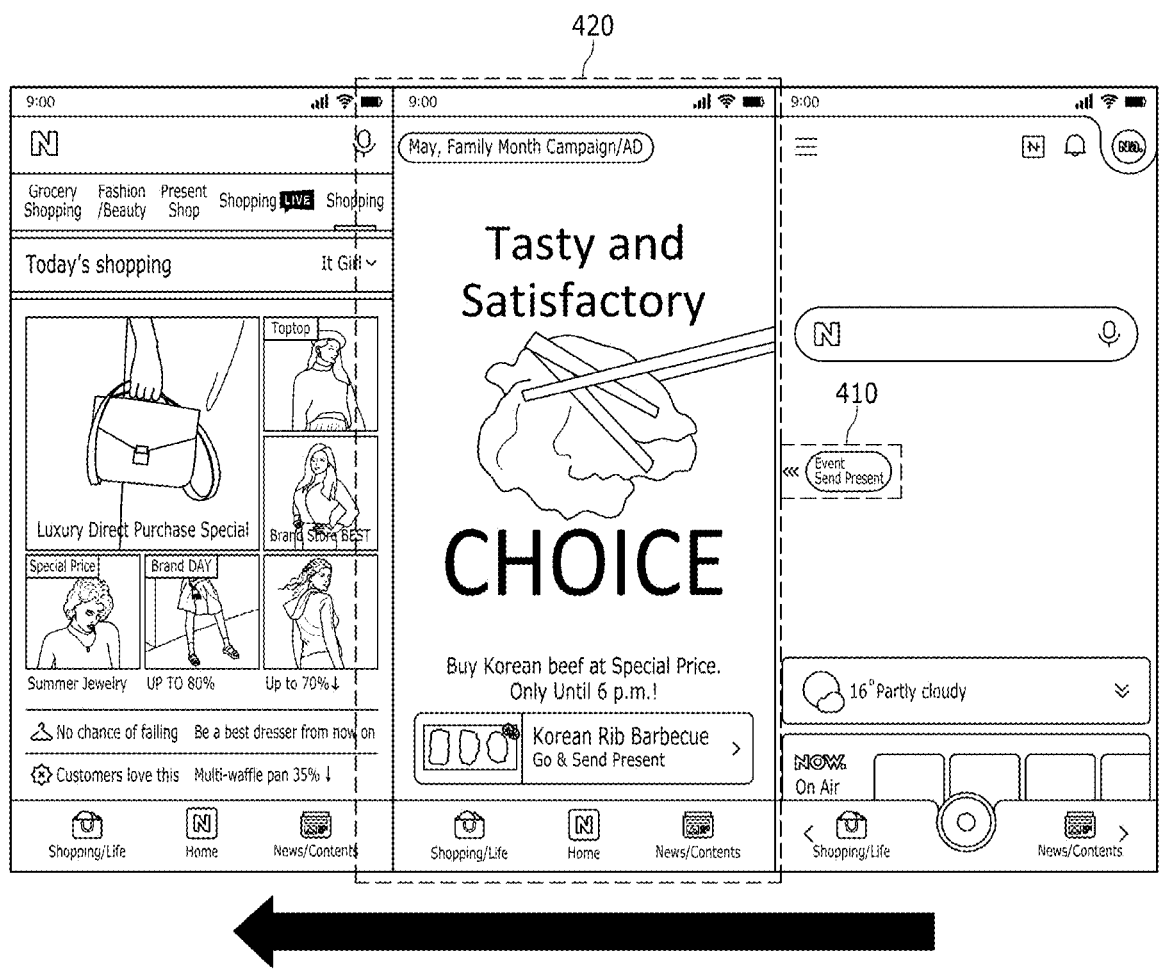
FIG. 4 is a diagram illustrating an example in which a first interstitial user interface, an interstitial advertisement, and a second interstitial user interface are arranged on a display of the user terminal according to an embodiment.

FIG. 4 is a diagram illustrating an example in which the first interstitial user interface, the interstitial advertisement, and the second interstitial user interface are arranged on the display of the user terminal according to an embodiment. In an embodiment, an application targeted for advertisement exposure may be configured with a plurality of user interfaces including the first interstitial user interface and the second interstitial user interface. The user may input a specific input to the user terminal such that the screen is transitioned from the current user interface to the adjacent user interface. For example, the user may swipe the display from the home screen (on the right-hand side of FIG. 4) to the right to transition to a shopping screen (on the left-hand side of FIG. 4). According to an embodiment, the user may set the interstitial advertisement to be exposed between adjacent user interfaces at a transition between the plurality of user interfaces. In this case, the interstitial advertisement may be exposed at a transition between the user interfaces. For example, when the user swipes the display from the home screen to the right, the screen may be transitioned to an interstitial advertisement display screen 420. In addition, upon swiping the display from the interstitial advertisement display screen 420 to the right, the screen may be transitioned to the shopping screen. Hereinafter, operations will be described in detail with reference to an example where an advertisement is exposed.

In an embodiment, in response to an input of a user touching or clicking an affordance 410, or in response to a touch input, a swipe input or a click input to transition from the first interstitial user interface to the second interstitial user interface, and the like, the first interstitial user interface may be transitioned to the interstitial advertisement display area 420. The interstitial advertisement display area 420 may refer to an area that is displayed on the display of the user terminal while the interstitial advertisement is being output.

The interstitial advertisement display area 420 may include the interstitial advertisement and a portion of the second interstitial user interface.

According to an embodiment, the area where the portion of the second interstitial user interface is output may be an area associated with the second interstitial user interface. For example, as illustrated, upon swiping from the left area where the second interstitial user interface is output to the right, the interstitial advertisement may be transitioned to the second interstitial user interface. With such a configuration, the user is able to recognize that the interstitial advertisement is displayed in the process of transition from the first interstitial user interface to the second interstitial user interface, and that the user can transition to the second interstitial user interface when desired, and accordingly, user convenience can be promoted while the high advertisement effect of the interstitial advertisement is maintained.

According to an embodiment, the interstitial advertisement may be associated with the content in the first interstitial user interface or the second interstitial user interface. For example, as illustrated, when the content in the second interstitial user interface is shopping content, the interstitial advertisement may include an advertisement related to shopping. Additionally or alternatively, the affordance 410 may be associated with the interstitial advertisement. For example, in order to induce the user to transition to the interstitial advertisement, the affordance 410 may include content such as text, image, animation, video, and the like associated with the interstitial advertisement.

Figure 5:
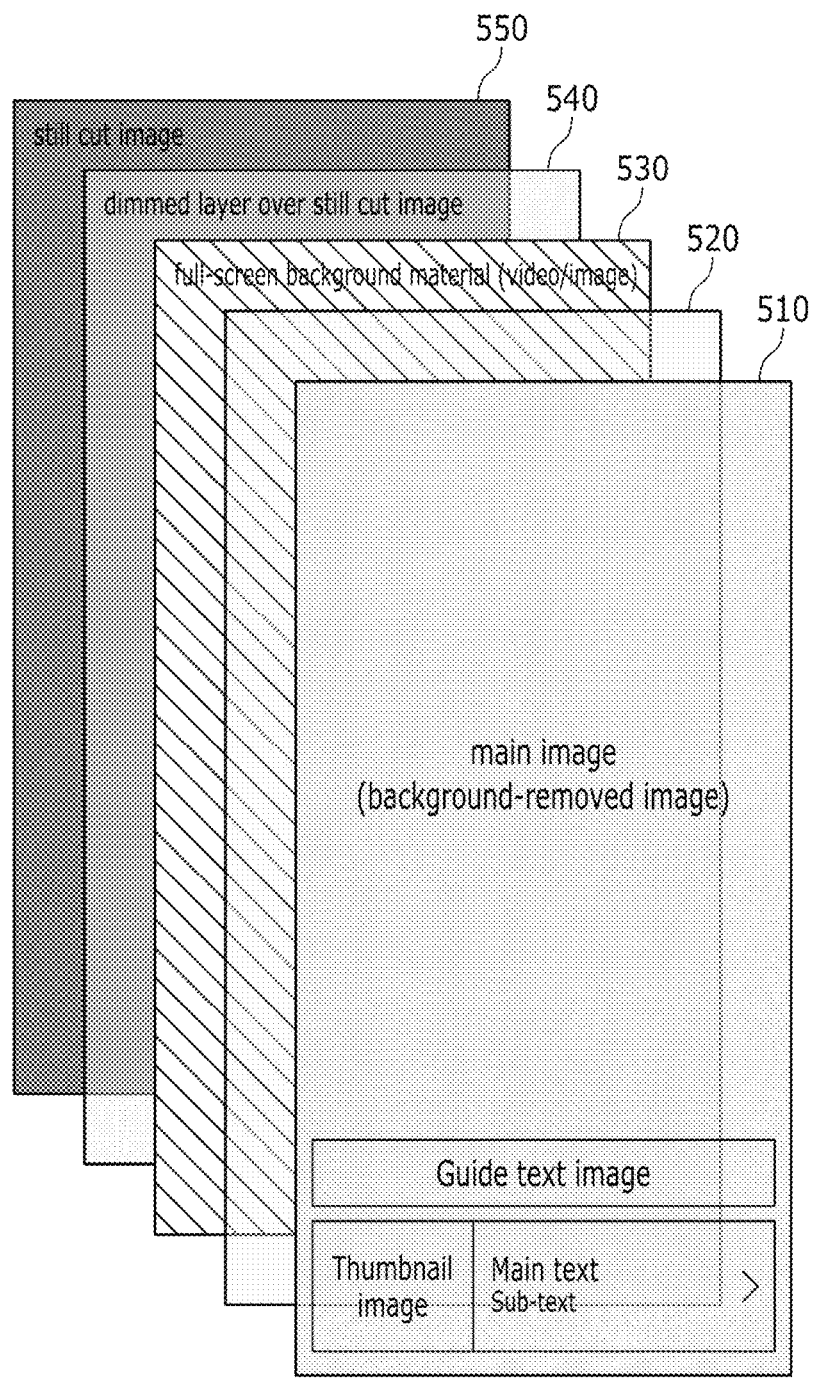
FIG. 5 is a diagram illustrating an example of an interstitial advertisement layer configuration according to an embodiment.

FIG. 5 is a diagram illustrating an example of an interstitial advertisement layer configuration according to an embodiment. According to an embodiment, the interstitial advertisement may be configured with several layers of images overlapped on each other. For example, the interstitial advertisement may include a main layer 510, a dimmed layer 520, and a background layer 530. The main layer 510 may include a main image (e.g., a background-removed image), a main animation, a main video, or a main text, or the like. Additionally, the main layer 510 may include a user interface including a link associated with a guide text image or interstitial advertisement. The background layer 530 may include a background image, a background video or a background animation, or the like. The dimmed layer 520 may include a translucent shaded layer inserted to differentiate and emphasize the main layer 510 from the background layer 530. In an embodiment, the dimmed layer 520 may be inserted between the background layer and the main layer 510.

Additionally, when the background layer includes an image such as a background video or a background animation and the like, the interstitial advertisement may further include a still cut image 550 and a dimmed layer 540 over the still cut image. In an embodiment, the still cut image 550 may be an image captured from one scene of the background image, and may be exposed before the background image is loaded.

Figure 6:
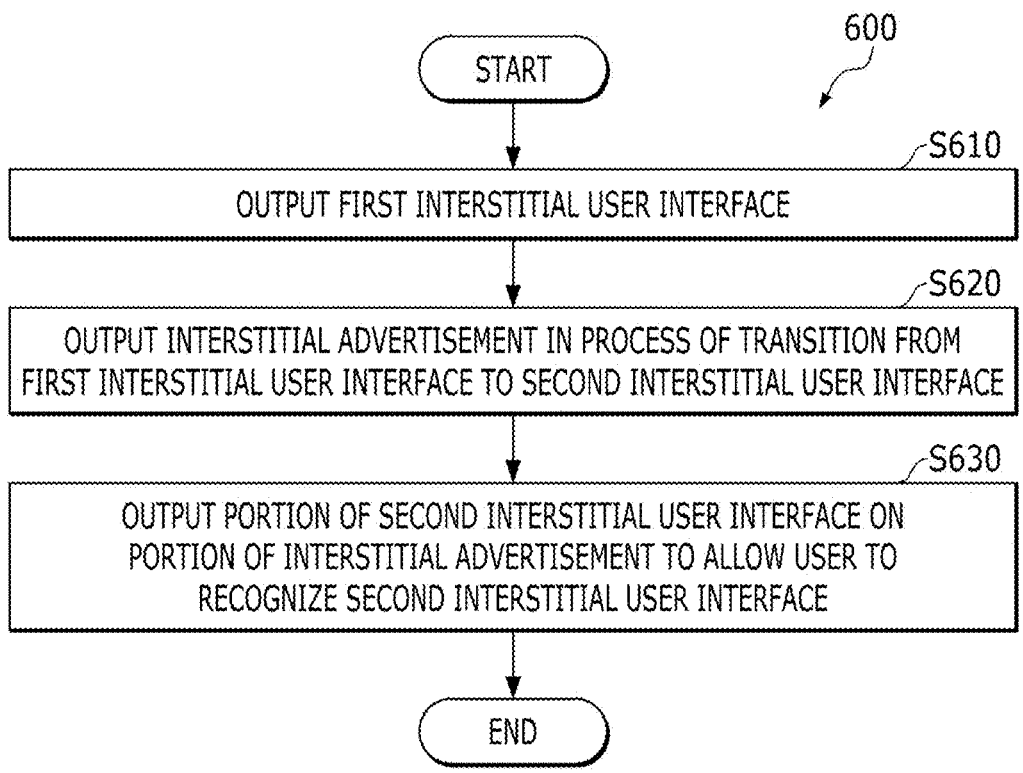
FIG. 6 is a flowchart illustrating a method for exposing online advertisements according to an embodiment.

FIG. 6 is a flowchart illustrating a method 600 for exposing online advertisements according to still another embodiment. According to an embodiment, the method 600 for exposing an online advertisement may be initiated by the processor of the user terminal outputting the first interstitial user interface, at S610. The outputting the first interstitial user interface may be performed in response to a user input. For example, the processor of the user terminal may output the first interstitial user interface in response to a user input requesting entry to the first interstitial user interface or in response to a user input requesting to transition from another interstitial user interface to the first interstitial user interface, and the like.

According to an embodiment, the processor of the user terminal may output an interstitial advertisement during a transition from the first interstitial user interface to the second interstitial user interface, at S620. The process of transitioning from the first interstitial user interface to the interstitial advertisement may also be performed in response to a user input. In addition, the corresponding process may be implemented in various ways. For example, in an implementation, in response to a user input swiping the first interstitial user interface through the touch screen, the first interstitial user interface on the upper layer may disappear in the direction of swiping and the interstitial advertisement of the lower layer may be exposed.

The method 600 for exposing the online advertisement may be ended by the processor of the user terminal outputting a portion of the second interstitial user interface on the portion of the interstitial advertisement to allow the user to recognize the second interstitial user interface, at S630. With such a configuration, the user is able to recognize that the interstitial advertisement is displayed in the process of transition from the first interstitial user interface to the second interstitial user interface, and that the user can transition to the second interstitial user interface when desired, and accordingly, user convenience can be promoted while the high advertisement effect of the interstitial advertisement is maintained.

Figure 7:
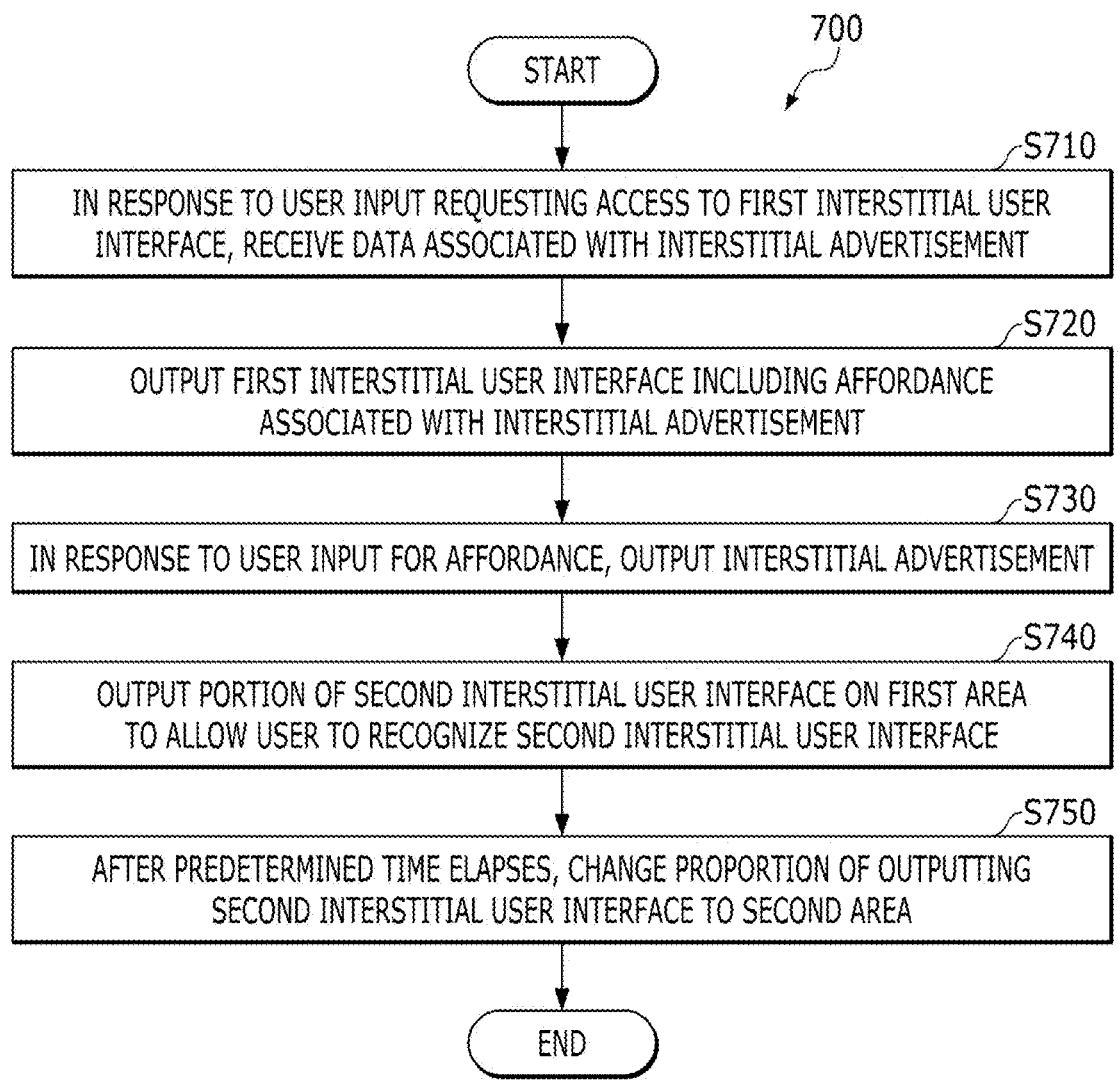
FIG. 7 is a flowchart illustrating a method for exposing online advertisements according to another embodiment.

FIG. 7 is a flowchart illustrating a method 700 for exposing online advertisements according to another embodiment. According to an embodiment, the method 700 may be initiated by the processor of the user terminal receiving data associated with the interstitial advertisement in response to a user input requesting access to the first interstitial user interface, at S710. For example, the data associated with the interstitial advertisement may include data for outputting the interstitial advertisement. Additionally, the processor of the user terminal may receive the data associated with affordance along with the data associated with the interstitial advertisement.

According to an embodiment, the processor of the user terminal may output the first interstitial user interface including the affordance associated with the interstitial advertisement, at S720. The affordance may include the content such as text, image, and video associated with the interstitial advertisement, and may serve to induce the user to select the interstitial advertisement so that the interstitial advertisement is output.

According to an embodiment, the processor of the user terminal may output the interstitial advertisement in response to a user input for the affordance, at S730. For example, in response to an input of the user touching the affordance, the processor of the user terminal may output the interstitial advertisement based on the received data associated with the interstitial advertisement. In an embodiment, the processor of the user terminal may configure and output the interstitial advertisement based on data associated with the received interstitial advertisement.

In an embodiment, the processor of the user terminal may output a portion of the second interstitial user interface to the first area to allow the user to recognize the first interstitial user interface, at S740. In this case, the portion of the second interstitial user interface output may serve as a guide that informs the user of possible transition to the second interstitial user interface. That is, it may be a kind of affordance.

After a predetermined time elapses, the processor of the user terminal may change the output area of the second interstitial user interface to the second area, at S750. In this case, the size of the second area may be smaller than the size of the first area. In an embodiment, the process of reducing the output area of the second interstitial user interface may be implemented with an animation effect. The predetermined time may be designated to be a time to allow the user to recognize the portion of the second interstitial user interface. As described above, after the time for the user to recognize the second interstitial user interface elapses, by decreasing the output area of the second interstitial user interface and increasing the output area of the advertisement, it is possible to efficiently expose advertisements while maintaining user convenience.

Figure 8:
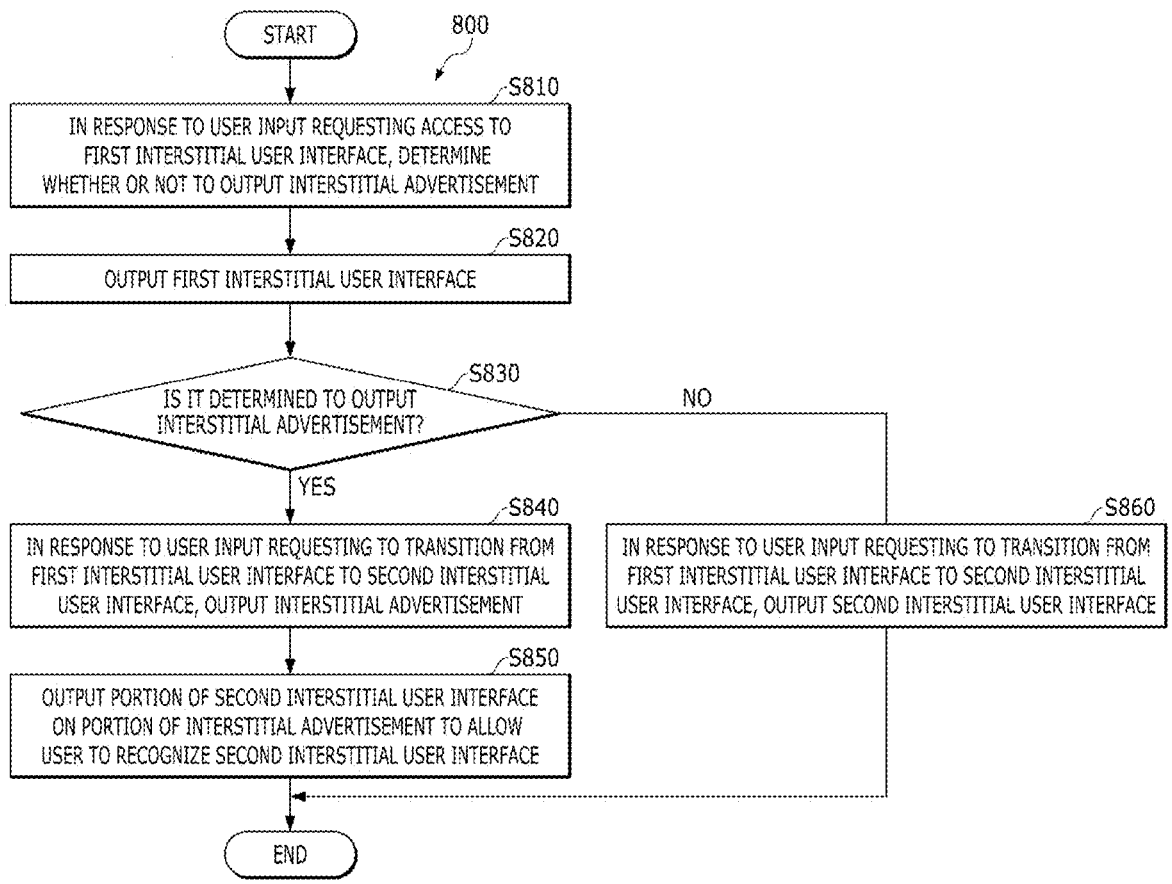
FIG. 8 is a flowchart illustrating a method for exposing online advertisements according to still another embodiment.

FIG. 8 is a flowchart illustrating a method 800 for exposing online advertisements according to still another embodiment. The method 800 may be initiated by the processor determining whether or not to output an interstitial advertisement in response to a user input requesting access to the first interstitial user interface, at S810. In an embodiment, the determining of whether or not to output the interstitial advertisement may be performed by the processor of the user terminal. For example, the user terminal may determine whether or not to output the interstitial advertisement based on whether the data associated with the interstitial advertisement is received from the information processing system. As another example, the processor of the user terminal may determine whether or not to output the interstitial advertisement based on the number of times the interstitial advertisement is output by the corresponding user terminal. That is, when the user terminal exposes the corresponding interstitial advertisement a predetermined number of times, the processor of the user terminal may stop outputting the corresponding interstitial advertisement.

Additionally or alternatively, the determining of whether or not to output the interstitial advertisement may be performed by the processor of the information processing system. For example, whether or not to output the interstitial advertisement may be determined based on the total number of exposures or time period of exposure of the interstitial advertisement. In this case, when it is determined not to output the interstitial advertisement, the processor of the information processing system may not transmit the data related to the interstitial advertisement to the user terminal.

The processor of the user terminal may output the first interstitial user interface, at S820. According to an embodiment, the first interstitial user interface may include the affordance. In another embodiment, the first interstitial user interface may not output the affordance. For example, when it is determined not to output the interstitial advertisement at S810, the processor of the user terminal may not output the affordance. The subsequent process varies according to whether it is determined to output the interstitial advertisement, at S830.

In an embodiment, when it is determined to output the interstitial advertisement, the processor of the user terminal may output the interstitial advertisement in response to a user input requesting to transition from the first interstitial user interface to the second interstitial user interface, at S840, and may output a portion of the second interstitial user interface on a portion of the interstitial advertisement to allow the user to recognize the second interstitial user interface, at S850. Thereafter, according to an input of the user swiping the touch screen on the interstitial advertisement screen, the processor of the user terminal may output the second interstitial user interface.

In another embodiment, when it is determined not to output the interstitial advertisement, the method 800 may be ended by the processor of the user terminal outputting the second interstitial user interface in response to the user input requesting to transition from the first interstitial user interface to the second interstitial user interface, at S860. That is, the interstitial advertisement may not be output.

Figure 9:
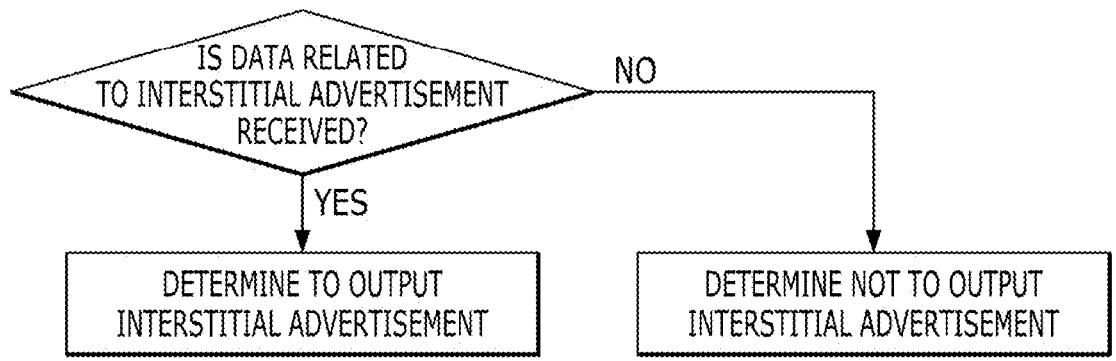
FIG. 9 is a flowchart illustrating a method for determining whether or not to output an interstitial advertisement according to an embodiment.
Figure 9:
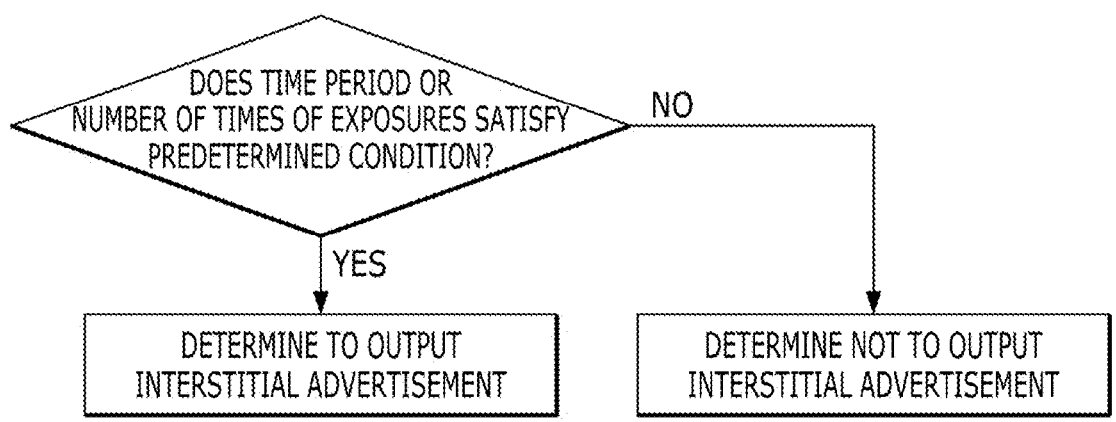

FIG. 9 is a flowchart illustrating a method (S810*a*, S810*b*) for determining whether or not to output an interstitial advertisement according to an embodiment. As described above with reference to FIG. 8, in an embodiment, the processor may determine whether or not to output an interstitial advertisement in response to a user input requesting access to the first interstitial user interface, at S810. This determination of whether or not to output an interstitial advertisement may be performed by the processor of the user terminal or the processor of the information processing system.

For example, the processor of the user terminal may determine whether or not to output an interstitial advertisement according to whether the data associated with the interstitial advertisement is received, at S810*a*. When the data associated with the interstitial advertisement is received, the processor of the user terminal may determine to output the interstitial advertisement, and configure a user interface associated with the interstitial advertisement based on the received data and output the interstitial advertisement. When the data associated with the interstitial advertisement is not received, the processor of the user terminal may determine not to output the interstitial advertisement, and output the second interstitial user interface in response to a user input requesting to transition from the first interstitial user interface to the second interstitial user interface.

As another example, the processor of the information processing system or the processor of the user terminal may determine whether or not to output the interstitial advertisement according to whether the time period or the number of times of exposures of the interstitial advertisement satisfies a predetermined condition, at S810*b*. For example, when the total number of times that the interstitial advertisement is exposed to a plurality of user terminals satisfies a predetermined frequency condition, the processor of the information processing system may determine to output the interstitial advertisement and transmit the data associated with the interstitial advertisement to the user terminal. As another example, the processor of the user terminal may determine not to output the interstitial advertisement when the number of times the interstitial advertisement is exposed in the corresponding user terminal does not satisfy a predetermined number of times condition.

According to this determination, the processor of the user terminal may selectively output an interstitial advertisement in response to a user input requesting to transition from the first interstitial user interface to the second interstitial user interface.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the functions described above for each particular application in various ways, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. A general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. Further, such modifications and changes are intended to fall within the scope of the claims appended herein.

The invention claimed is:

1. A method for exposing online content on a display, the method executed by one or more processors and comprising:
outputting a first user interface on the display;
outputting an interstitial content on the display prior to outputting a second user interface in a process of transition from the first user interface to the second user interface in response to a first user input on the first user interface;
outputting, based on a first direction of the first user input, a portion of the second user interface following the output of the interstitial content on a portion of the output interstitial content so that the portion of the second user interface appears in the first direction and displayed overlaid on the portion of the interstitial content;
reducing an output area of the portion of the second user interface by rendering the output area of the portion of the second user interface to disappear in a second direction opposite the first direction after a predetermined time; and
outputting an entirety of the second user interface on the display and removing the interstitial content from the display responsive to a second user input on the interstitial content.

2. The method according to claim 1, wherein the outputting the portion of the second user interface includes:
outputting the portion of the second user interface on a first area of the interstitial content; and
changing an output area of the portion of the second user interface to a second area of the interstitial content after a predetermined time elapses, and
a size of the second area is smaller than a size of the first area.

3. The method according to claim 1, wherein the interstitial content is associated with a content in the first user interface or the second user interface.

4. The method according to claim 1, wherein the first user interface includes an affordance associated with the interstitial content.

5. The method according to claim 4, wherein the interstitial content is output in the process of transition from the first user interface to the second user interface responsive to a user input on the affordance.

6. The method according to claim 1, further comprising, in response to a user input requesting access to the first user interface, receiving data associated with the interstitial content.

7. The method according to claim 1, wherein the interstitial content includes a main layer, a dimmed layer and a background layer.

8. The method according to claim 7, wherein the interstitial content further includes a still cut image and a dimmed layer over the still cut image, and the background layer includes a background image.

9. The method according to claim 1, wherein the interstitial content includes advertisements.

10. A method for exposing online content on a display, the method executed by one or more processors and comprising:
in response to a user input requesting access to a first user interface, determining whether to output an interstitial content;
outputting the first user interface on the display;
in response to a first user input requesting to transition from the first user interface to a second user interface, selectively outputting the interstitial content on the display prior to outputting a second user interface according to the determination of whether to output the interstitial content;
outputting, based on a first direction of the first user input, a portion of the second user interface following the output of the interstitial content on a portion of the output interstitial content so that the portion of the second user interface appears in the first direction and displayed overlaid on the portion of the interstitial content;
reducing an output area of the portion of the second user interface by rendering the output area of the portion of the second user interface to disappear in a second direction opposite the first direction after a predetermined time; and
outputting an entirety of the second user interface on the display and removing the interstitial content from the display responsive to a second user input on the interstitial content.

11. The method according to claim 10, wherein the interstitial content is output when data associated with the interstitial content is received.

12. The method according to claim 10, wherein the interstitial content is output when a time period or a number of times of exposures of the interstitial content satisfies a predetermined condition.

13. The method according to claim 10, wherein the interstitial content includes advertisements.

14. A non-transitory computer-readable recording medium storing instructions that, when executed by one or more processors, cause the one or more processors to perform the method according to claim 1.

15. A method for exposing online content in an application that includes a plurality of user interfaces that can be transitioned to each other according to a user input of swiping a display, the method being executed by one or more processors and comprising:
receiving a user input for setting an interstitial content to be placed between a first user interface and a second user interface of the plurality of user interfaces;
outputting the first user interface on the display;
determining whether the interstitial content is set to be placed between the first user interface and the second user interface based on the user input;
when the interstitial content is set to be placed between the first user interface and the second user interface, according to a first user input of swiping the display, outputting the interstitial content on the display in a process of transition from the first user interface to the second user interface prior to outputting a second user interface;
outputting, based on a first direction of the first user input, a portion of the second user interface following the output of the interstitial content on a portion of the output interstitial content, so that the portion of the second user interface appears in the first direction and displayed overlaid on the portion of the interstitial content;
reducing an output area of the portion of the second user interface by rendering the output area of the portion of the second user interface to disappear in a second direction opposite the first direction after a predetermined time; and
in response to a second user input of swiping the portion of the interstitial content, outputting an entirety of the second user interface on the display and removing the interstitial content from the display.

16. The method according to claim 15, wherein the outputting the interstitial content on the display includes:
when the interstitial content is set to be placed between the first user interface and the second user interface, according to the first user input of swiping the display in the first direction, outputting the interstitial content on the display such that the interstitial content is exposed in the first direction during the transition from the first user interface to the second user interface.

17. The method according to claim 15, wherein the interstitial content includes advertisements.

* * * * *